(12) United States Patent
Flaig et al.

(10) Patent No.: US 8,097,204 B2
(45) Date of Patent: Jan. 17, 2012

(54) BEVEL HEAD ATTACHMENT FOR PLASMA AND OXY FUEL CUTTING MACHINES

(75) Inventors: Robert T. Flaig, Holland, NY (US); Garick J. Tischler, Lakeview, NY (US)

(73) Assignee: Koike Aronson, Inc., Arcade, NY (US)

( * ) Notice: Subject to any disclaimer, the term of this patent is extended or adjusted under 35 U.S.C. 154(b) by 229 days.

(21) Appl. No.: 12/617,299

(22) Filed: Nov. 12, 2009

(65) Prior Publication Data

US 2011/0109022 A1    May 12, 2011

(51) Int. Cl.
*B23K 7/10* (2006.01)

(52) U.S. Cl. ............................................. 266/77; 266/48

(58) Field of Classification Search .................... 266/48, 266/77, 76
See application file for complete search history.

(56) References Cited

U.S. PATENT DOCUMENTS

| | | | |
|---|---|---|---|
| 4,205,828 | A | 6/1980 | Hooper et al. |
| 5,286,006 | A | 2/1994 | Ogura |
| 6,201,207 | B1 | 3/2001 | Maruyama et al. |
| 6,333,487 | B1 | 12/2001 | Maruyama |
| 7,074,112 | B2 | 7/2006 | Olsen |
| 2011/0109022 | A1* | 5/2011 | Flaig et al. .................. 266/77 |

OTHER PUBLICATIONS

Messer Cutting Systems, Inc., "Manual Plasma Bevel Unit", product flyer, at least as early as Mar. 2006, USA.
Komatsu Industries Corp., "About Root Twister TFPV", product literature, Nov. 14, 2006, Japan.
ESAB Cutting Systems, "Heavy-Duty Rotary Plasma Bevel System", product literature, Jan. 2008, USA.
Messer Cutting Systems, Inc., "Three Position Oxyfuel Bevel Unit", product flyer, at least as early as Sep. 10, 2009, USA.
Farley Production Equipment / Farley Laserlab, product descriptions on website http://americanmarketentry.com/products.htm, "Cutting & Drilling Options: Automatic Plasma Bevel Head", at least as early as Oct. 13, 2009, p. 4 of 7, USA.
Kinetic Cutting Systems Inc., product descriptions on website http://www.kineticusa.com/kinetic_cutting_heads.htm, "Automated Plasma and Oxy Fuel Bevel Cutting", at least as early as Oct. 13, 2009, p. 1 of 2, USA.

* cited by examiner

*Primary Examiner* — Scott Kastler
(74) *Attorney, Agent, or Firm* — Hodgson Russ LLP (57) ABSTRACT

A lightweight bevel head attachment for a torch cutting machine includes a horizontal support tray, a rotation assembly mounted under the support tray, a tilt assembly coupled to the rotation assembly for rotation therewith about a vertical axis, a torch holder carried and pivoted by the title assembly, and a rack-and-pinion lift assembly having a mounting plate for attachment to the cutting machine carriage. The tilt assembly includes a pair of link arms housing a pulley system for transmitting pivotal motion at an input shaft to an output shaft on which the torch holder is mounted. The bevel head attachment can provide bevel angles in a range of about +/−75 degrees.

10 Claims, 10 Drawing Sheets

BEVEL HEAD ATTACHMENT FOR PLASMA AND OXY FUEL CUTTING MACHINES

FIELD OF THE INVENTION

The invention relates generally to CNC machines for performing plasma arc cutting and/or oxy fuel cutting. The invention relates more particularly to an apparatus for positioning and tilting a cutting torch to perform a bevel cut.

BACKGROUND OF THE INVENTION

Plasma is an ionized gas that conducts electricity, and is created by adding energy, such as electricity, to an electrically neutral gas, such as compressed air. By adding electricity through an electrode (hafnium), the gas becomes imbalanced and conducts electricity. The more electrical energy added, the hotter the plasma arc becomes. Plasma arc cutting machines control this powerful energy by constricting the arc and forcing it through a cutting torch having a nozzle. By increasing air pressure and intensifying the arc with higher voltages, the arc becomes hotter and more capable of blasting through thicker metals and blowing away the cuttings. Plasma arc cutting systems require a power source, a plasma cutting torch, compressed air, electrical power, and a supply of tips and electrodes. Plasma arc cutting machines can rapidly and precisely cut through any electrically conductive metal without preheating and with a minimal heat-affected zone. Plasma can cut metals such as aluminum, stainless steel, brass, and copper in excess of two inches thick, along with expanded and stacked metals.

In oxy fuel cutting, an oxygen/fuel gas flame preheats the metal to its ignition temperature, and a high-power oxygen jet is directed through a cutting torch at the metal creating a chemical reaction between the oxygen and the metal to form iron oxide, also known as slag. The high-power oxygen jet removes the slag from the kerf. Cut quality, preheating times, and thicknesses can be influenced by the type of fuel gas used. Oxy fuel cutting is used for ferrous, mild and low-alloy steels in thicknesses up to two feet. Oxy fuel cutting systems require a fuel tank, an oxygen tank, and a cutting torch. Oxy fuel cutting allows metalworkers to cut extremely thick metals with ease.

In order to form a beveled edge when cutting, the cutting torch must be tilted from a vertical orientation normal to the surface of the material to a tilted orientation oblique to the surface of the material. For this purpose, bevel head attachments capable of tilting a cutting torch have been used. Such bevel head attachments typically mount on a carriage of the cutting machine. In a common arrangement for CNC cutting machines, the carriage is adapted for travel side-to-side along a transverse gantry, and the gantry is adapted to move along a longitudinal direction of a cutting table. The bevel head attachment allows the tilt angle of the cutting torch to be controlled as the carriage is displaced relative to the material being cut to provide a beveled edge along the cut path. The bevel head attachment also enables the torch to be rotated about a vertical axis to orient the torch as specified by the cut program.

Where the torch is an oxy fuel cutting torch, it connects to hoses for supplying oxygen, and for preheating oxygen and fuel gas. Where the torch is a plasma cutting torch, it connects to hoses for supplying plasma gas, hoses for supplying and delivering cooling water, and cables for electricity. Thus, the bevel head attachment should accommodate various types of hoses and electrical cables connected to the torch in a manner that permits the torch to be tilted and rotated smoothly, even as the hoses and cables flex and twist.

It is also desirable that the bevel head attachment be as lightweight as possible so that it may be mounted on different cutting machines and carriages having different load capacities.

U.S. Pat. No. 6,201,207 discloses a bevel head attachment of the prior art. The bevel head attachment uses a motorized three-dimensional parallelogram linkage for tilting a torch holder in which the torch is received. The linkage as a whole is rotatable by another motor about a vertical axis. The disclosed bevel head attachment is generally satisfactory, but is not as light as desired. The tilt mechanism described in the patent provides bevel angles in a range of about +/−45 degrees. In fact, applicants are unaware of any commercially available bevel head attachment capable of tilting the cutting torch enough to achieve a bevel cut substantially greater than 45 degrees from vertical.

SUMMARY OF THE INVENTION

The present invention is a bevel head attachment for mounting on a carriage of a torch cutting machine for controlling the tilt angle of a cutting torch held by the bevel head attachment. A bevel head attachment embodying the present invention generally comprises a horizontal support tray, a rotation assembly mounted under the support tray, a tilt assembly coupled to the rotation assembly for rotation therewith about a vertical axis, a torch holder carried by the tilt assembly, and a mounting plate for attachment to the cutting machine carriage.

The support tray includes an opening through which hoses and cables may pass, and may include a spring-loaded spool for tensioning the hoses and cables. The support tray also provides a support surface on which a gas metering console may be situated.

The rotation assembly includes a fixed arm, a rotating arm mounted for rotation relative to the fixed arm about a vertical axis, and a first motor operable to rotate the rotating arm about the vertical axis. The rotation assembly has a passage therethrough aligned on the vertical axis and overlapped by the tray opening.

The tilt assembly is coupled to the rotating arm of the rotation assembly for rotation with the rotating arm, and includes an input shaft, a second motor operable to pivot the input shaft, an output shaft parallel to the input shaft, and a linkage transmitting pivotal motion at the input shaft to the output shaft. The linkage may include a first link arm coupled to the input shaft to pivot with the input shaft, and a second link arm connected to the first link arm by a connecting pin extending parallel to the input shaft and the output shaft, wherein the first link arm and the second link arm pivot relative to one another about the connecting pin and the output shaft is carried by the second link arm. Housed within the link arms is a pulley system for transmitting pivotal motion at the input shaft to the to the output shaft such that the output shaft, and the torch holder coupled thereto, pivot (tilt) in correspondence with the input shaft.

The bevel head attachment may further comprise a lift assembly including a mounting plate fixedly attachable to the carriage, a toothed rack fixed to the mounting plate to extend in a vertical direction, a third motor mounted on the fixed arm of the rotation assembly, and a pinion gear driven by the third motor and mated with the toothed rack. In order to guide up and down motion, the mounting plate may include a pair of vertical linear guides spaced laterally from one another, and the fixed arm of the rotation assembly carries a pair of followers slidably mating with the pair of linear guides.

The present invention provides a lightweight bevel head attachment capable of achieving bevel angles within a range of about +/−75 degrees.

BRIEF DESCRIPTION OF THE DRAWINGS

The invention is described in detail below with reference to the following figures.

DETAILED DESCRIPTION OF THE INVENTION

Reference is made initially to FIGS. 1-6 of the drawings, wherein a bevel head attachment formed in accordance with an embodiment of the present invention is identified generally by the reference numeral 10. Bevel head attachment 10 is attachable to a carriage of a CNC cutting machine (not shown) of a type that uses a torch, for example a plasma arc cutting machine and/or an oxy fuel cutting machine. Bevel head attachment 10 receives a cutting torch T and is operable to tilt the cutting torch relative to surface S of the material to be cut, rotate the cutting torch about a vertical axis 12, and raise and lower the torch.

Bevel head attachment 10 generally comprises a horizontal support tray 14, a rotation assembly 16 mounted under support tray 14, a tilt assembly 18 coupled to the rotation assembly, a torch holder 20 coupled to the tilt assembly for releasably holding torch T, and a lift assembly 22 attachable to the cutting machine carriage. A torch cable carrier 17 is connected to torch T by a torch cable carrier mount 19.

Support tray 14 includes an opening 24 generally aligned on vertical axis 12. Opening 24 allows for passage of torch cable carrier 17 through the tray for connection to torch T. A spool 28 may be arranged between a pair of upstanding brackets 30 for guiding hoses and cables downward through opening 24. Spool 28 may be suspended by a pair of springs 32 fixed to brackets 30 to act as a tensioning device for the cables and hoses. Spool 28 may travel vertically within slots 26 provided in brackets 30. A flexible duct 34 may guide other cables and/or hoses, for example a coolant hose, downward toward opening 24. Support tray 14 also provides an upwardly facing surface on which a gas metering console 36 may be situated for regulating gas supply to torch T.

Lift assembly 22 includes a vertically disposed mounting plate 38 fixedly supporting a pair of vertical guide rails 40 and a vertically extending toothed rack 42. A pinion gear 44 is arranged to mate with toothed rack 42. Pinion gear 44 is driven by a bidirectional motor 46 acting through a transmission unit 48 to move upward or downward along rack 42 depending upon the direction of rotation. Transmission unit 48 is fastened to a fixed arm 60 of rotation assembly 16. Guide rails 40 are each slidably engaged by follower blocks 50 that are also fastened to fixed arm 60. A flexible cable carrier 52 having one end coupled to mounting plate 38 and another end coupled to fixed arm 60 may also be provided to accommodate electrical cables and wiring. The range of vertical travel by lift assembly 22 may be defined by upper and lower limit switches 53 arranged near one of the guide rails 40 for engagement by a limit tab 55 provided on fixed arm 60 adjacent follower block 50, whereby lift motor 46 may be deactivated if either limit switch 53 is tripped.

Figure 1:
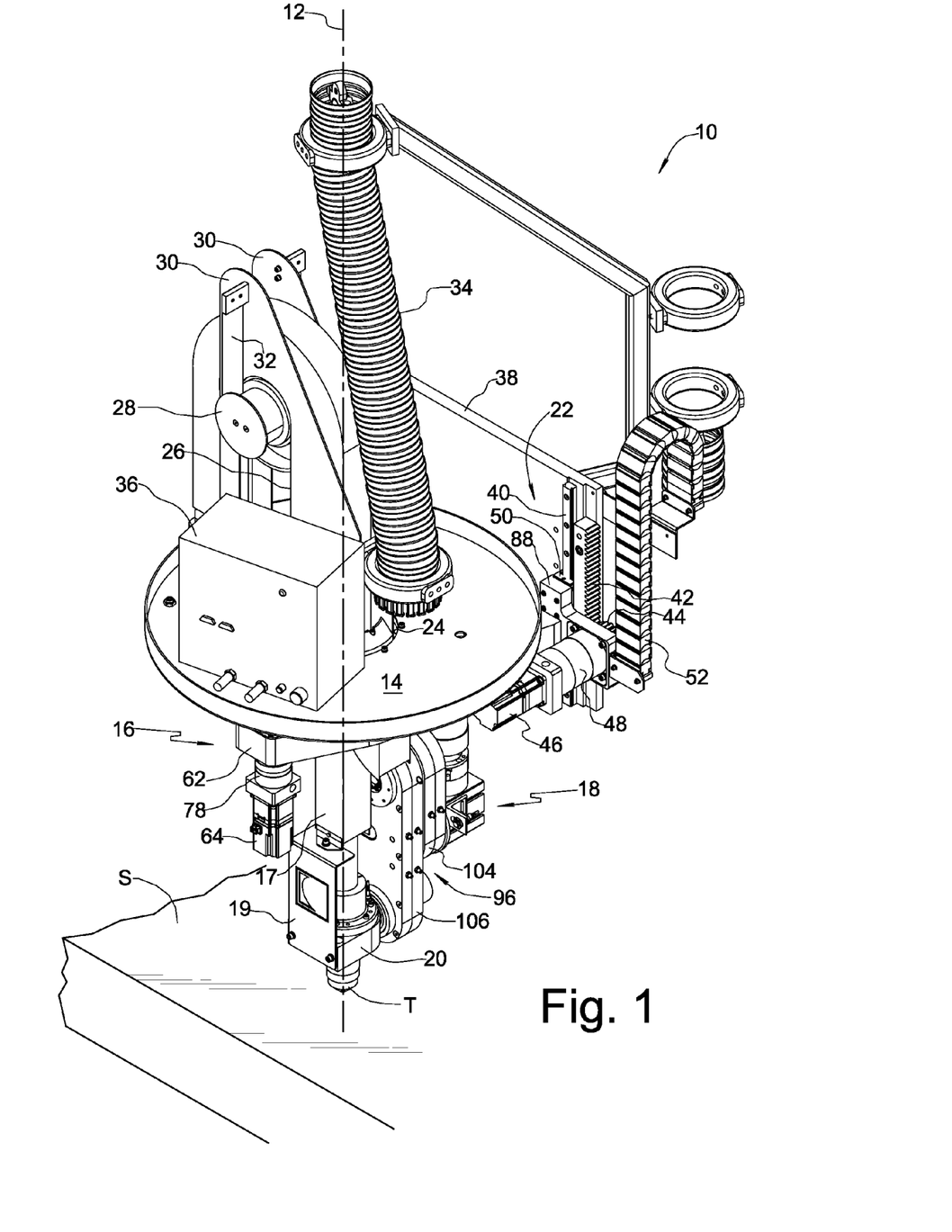
FIG. 1 is a perspective view of a bevel head attachment formed in accordance with an embodiment of the present invention.
Figure 2:
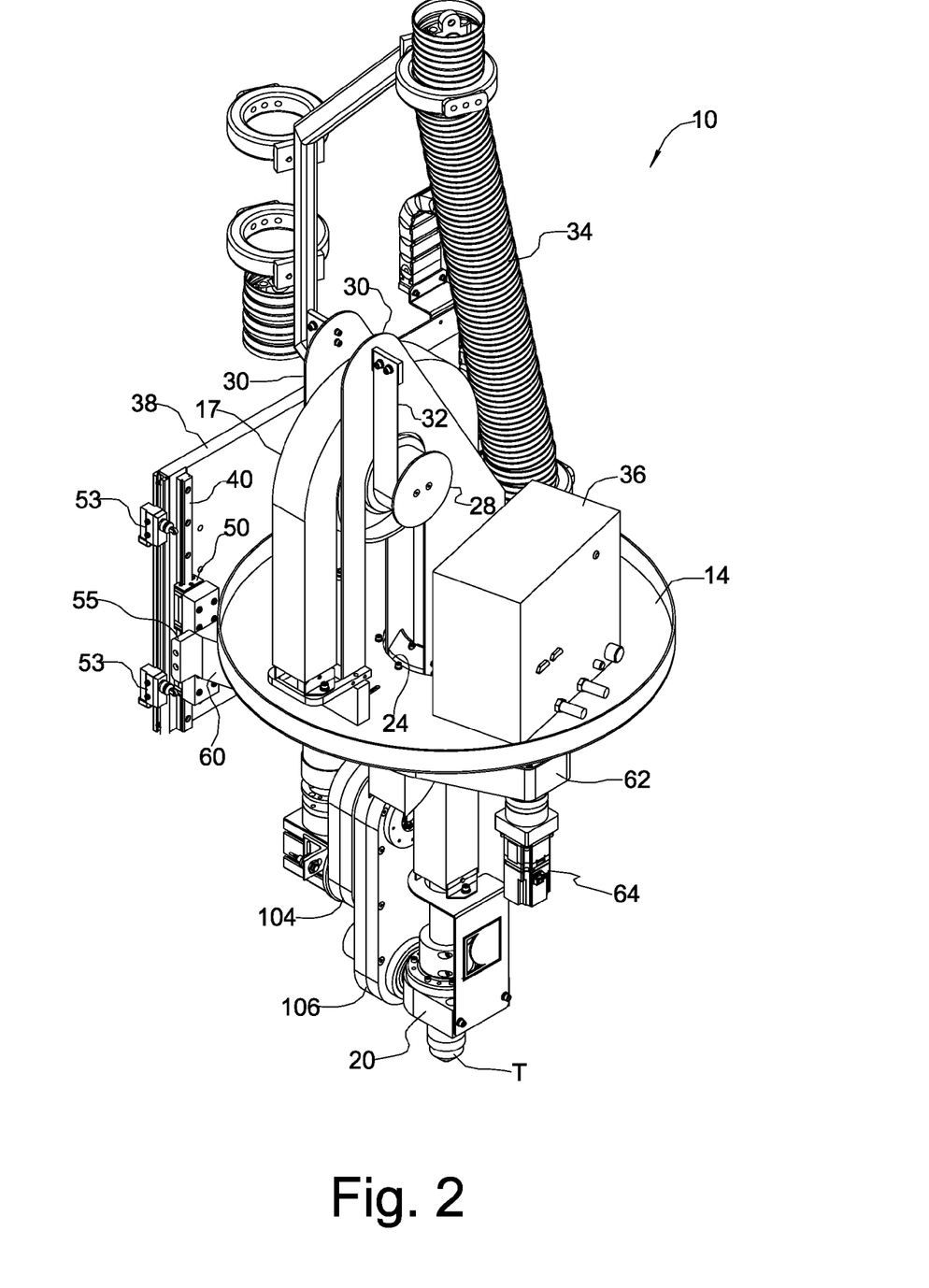
FIG. 2 is another perspective view of the bevel head attachment shown in FIG. 1.
Figure 3:
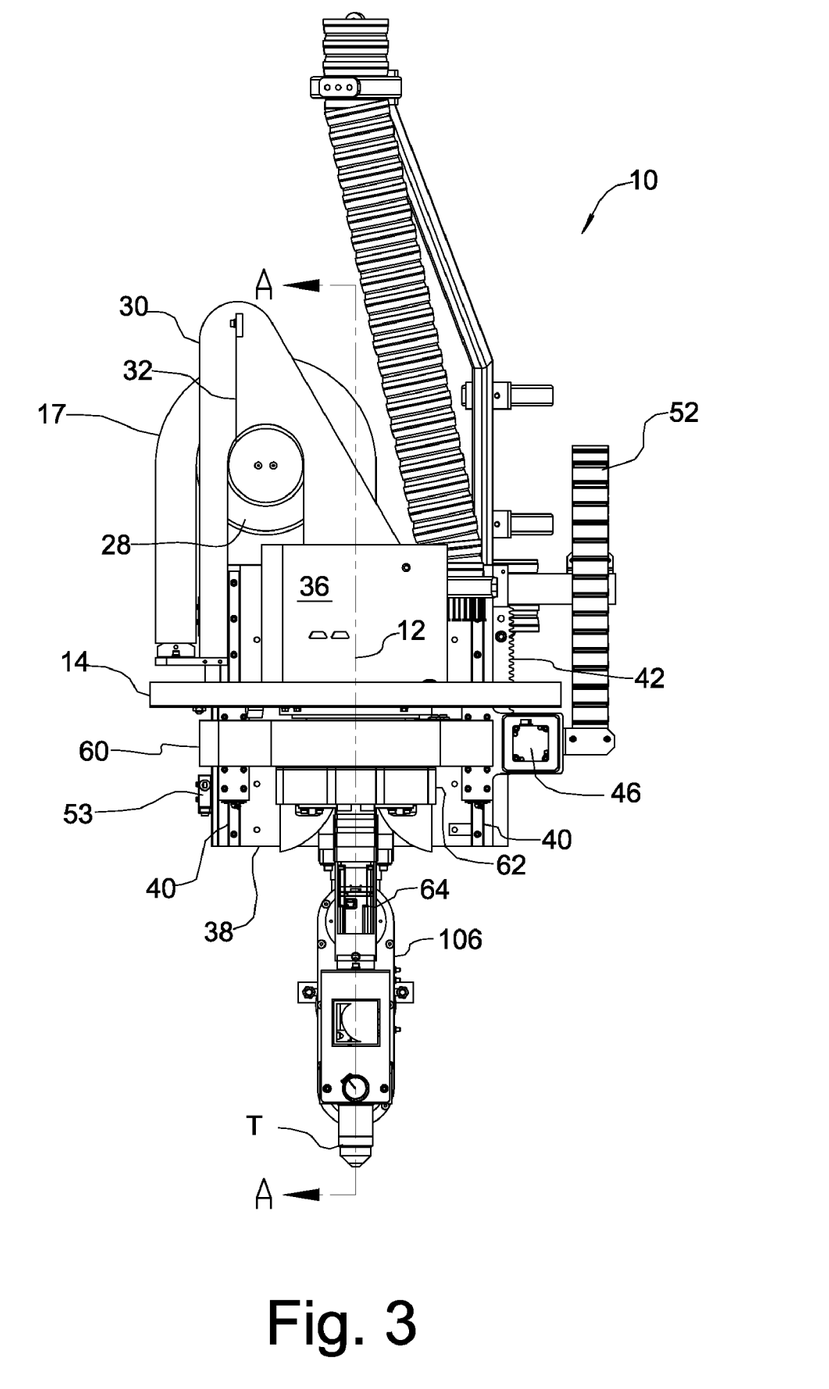
FIG. 3 is a front elevational view of the bevel head attachment.
Figure 4:
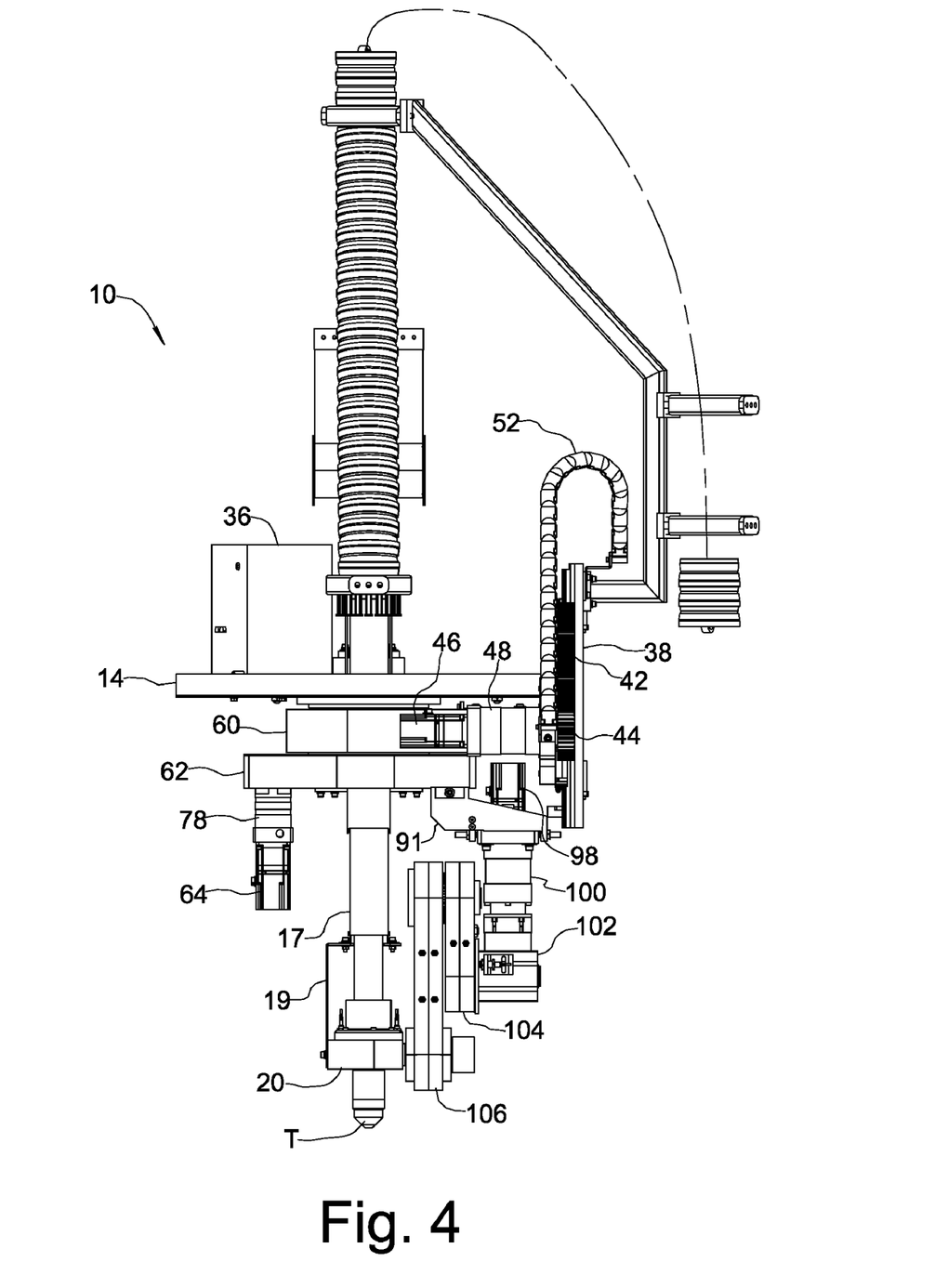
FIG. 4 is a side elevational view of the bevel head attachment.
Figure 5:
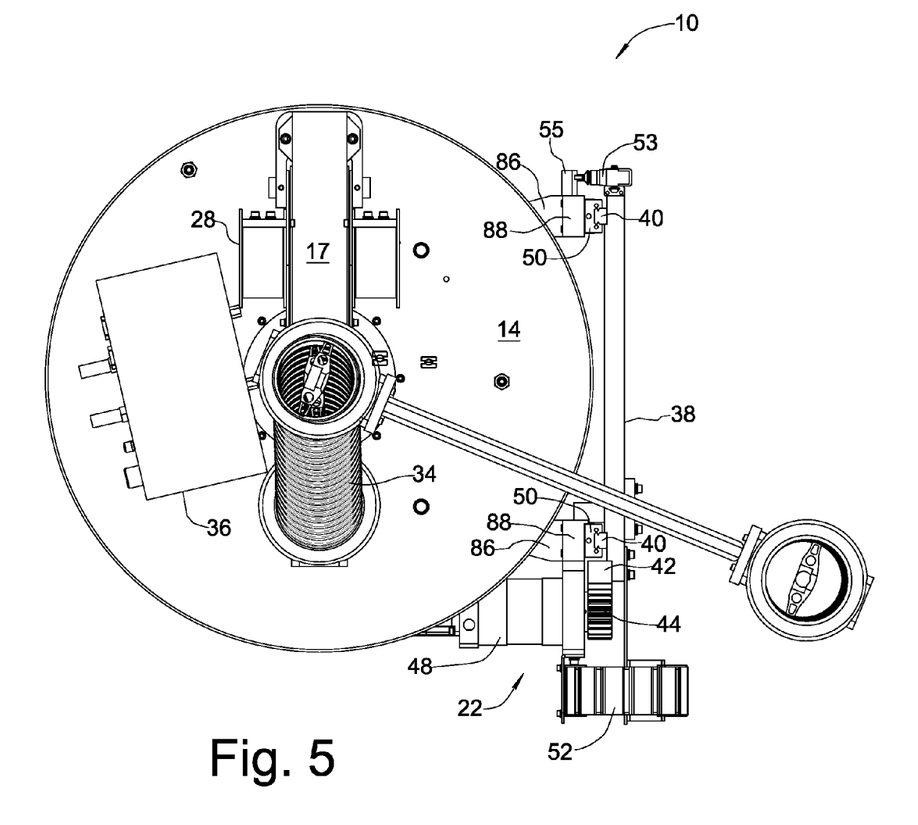
FIG. 5 is a top plan view of the bevel head attachment.
Figure 6:
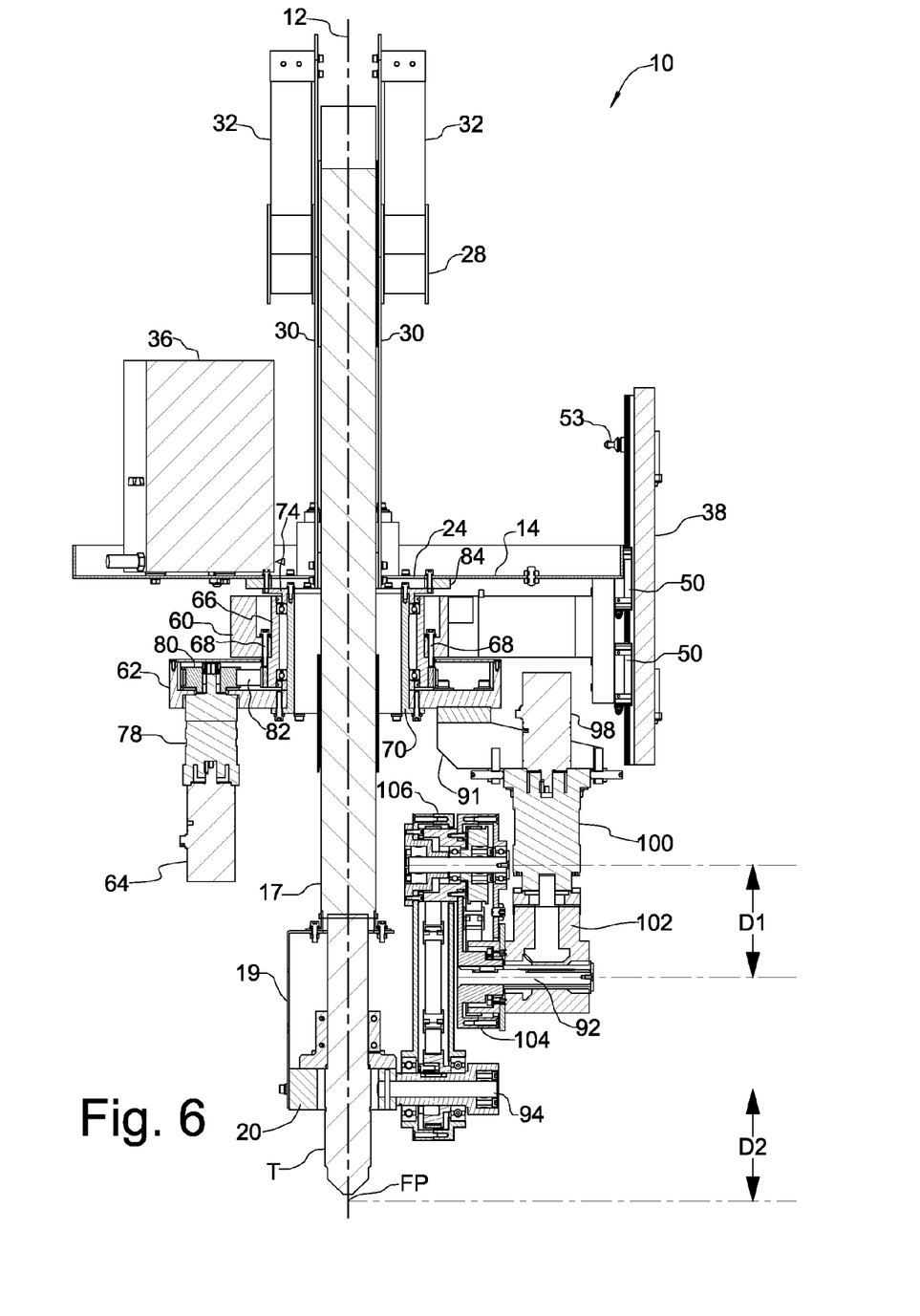
FIG. 6 is a sectional view of the bevel head attachment taken generally along the line A-A in FIG. 3.
Figure 8:
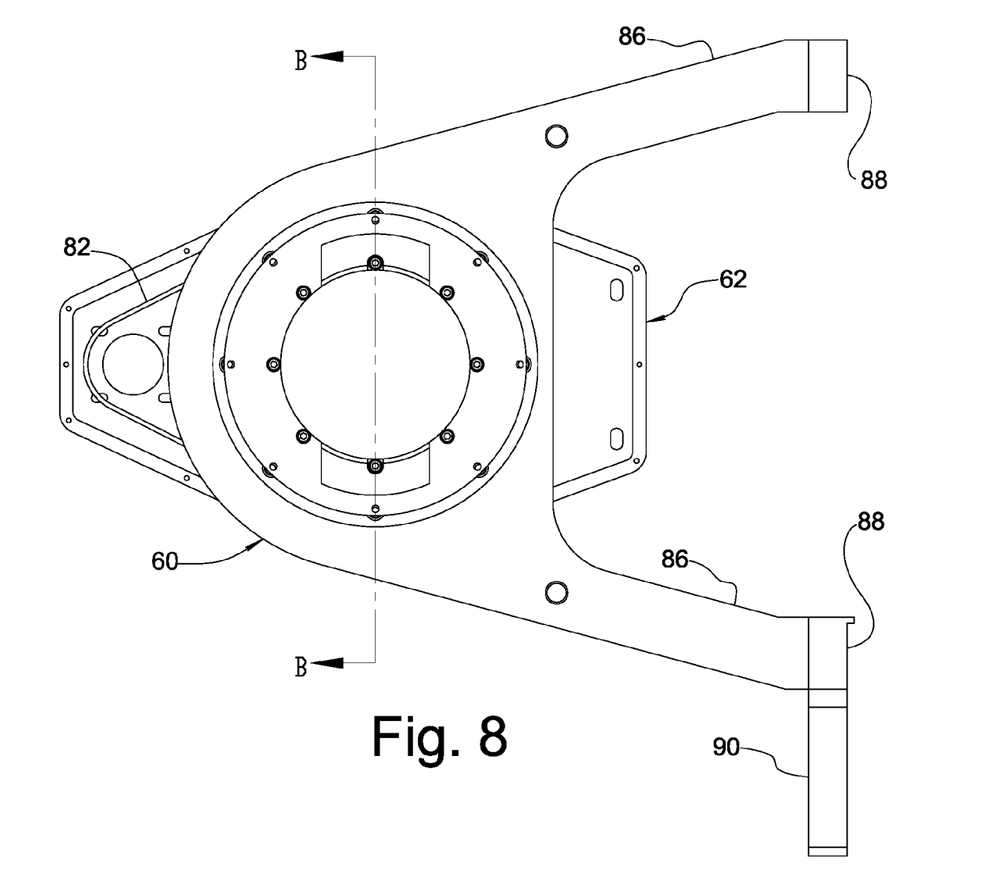
FIG. 8 is a top plan view showing elements of a rotation assembly of the bevel head attachment.
Figure 9:
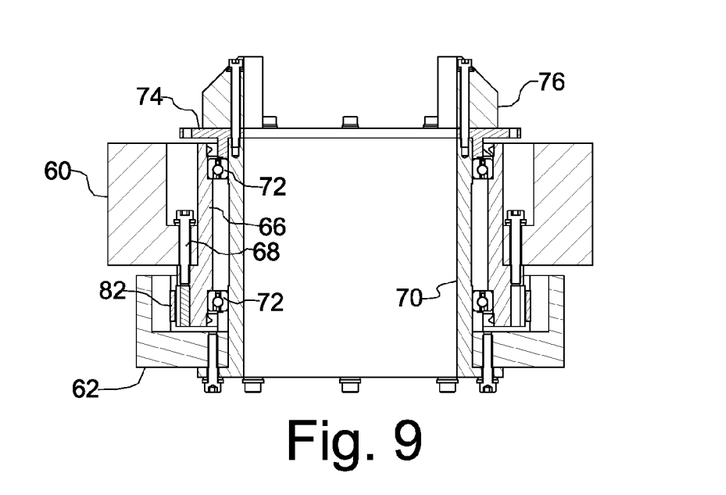
FIG. 9 is a sectional view of the rotation assembly elements taken generally along the line B-B in FIG. 8.

Rotation assembly 16 is mounted directly under support tray 14 and includes fixed arm 60 that moves up-and-down but does not rotate relative to mounting plate 38, a rotating arm 62 mounted for rotation relative to fixed arm 60 about vertical axis 12, and a motor 64 operable to rotate the rotating arm 62 about vertical axis 12. FIGS. 8 and 9 show elements of rotation assembly 16 in further detail. As best seen in FIGS. 6 and 9, fixed arm 60 is fastened to a fixed cylindrical sleeve 66 by fasteners 68. A rotating cylindrical sleeve 70 is mounted coaxially within fixed sleeve 66 by a pair of rotary bearings 72 such that rotating sleeve 70 is rotatable relative to fixed sleeve 66 about their common axis 12. A retainer ring 74 is fastened to a top end of rotating sleeve 70. A pair of cable carrier guide mounts 76 may also be fastened to the top end of rotating sleeve 70. The inner wall of rotating sleeve 70 defines a passage through rotation assembly 16 that is aligned on vertical axis 12 and that is overlapped at least partially by tray opening 24.

Motor 64 is connected through a transmission unit 78 to a pulley 80 mounted within rotating arm 62. A timing belt 82 is arranged about pulley 80 and fixed sleeve 66. Consequently, motor 64 is operable to rotate pulley 80, thereby causing rotating arm 62 and rotating sleeve 70 to rotate about axis 12 relative to fixed arm 60. As may be seen in FIG. 6, support tray 14 is fastened to a spacer ring 84 which in turn is fastened to retaining ring 74, whereby support tray 14 will rotate with rotating arm 62 and rotating sleeve 70 about axis 12. As may be understood, the direction of rotation of rotating arm 62 will depend upon the direction of rotation of motor 64. With hoses and cables connected, the rotation assembly provides 540 degrees of rotation about vertical axis 12.

Fixed arm 60 includes a pair of legs 86 each extending rearward toward mounting plate 38 and terminating in a follower mount 88 at which followers 50 may be mounted. One of the legs 86 is also provided with a transmission mount 90 to which transmission unit 48 of lift assembly 22 may be mounted.

Figure 10:
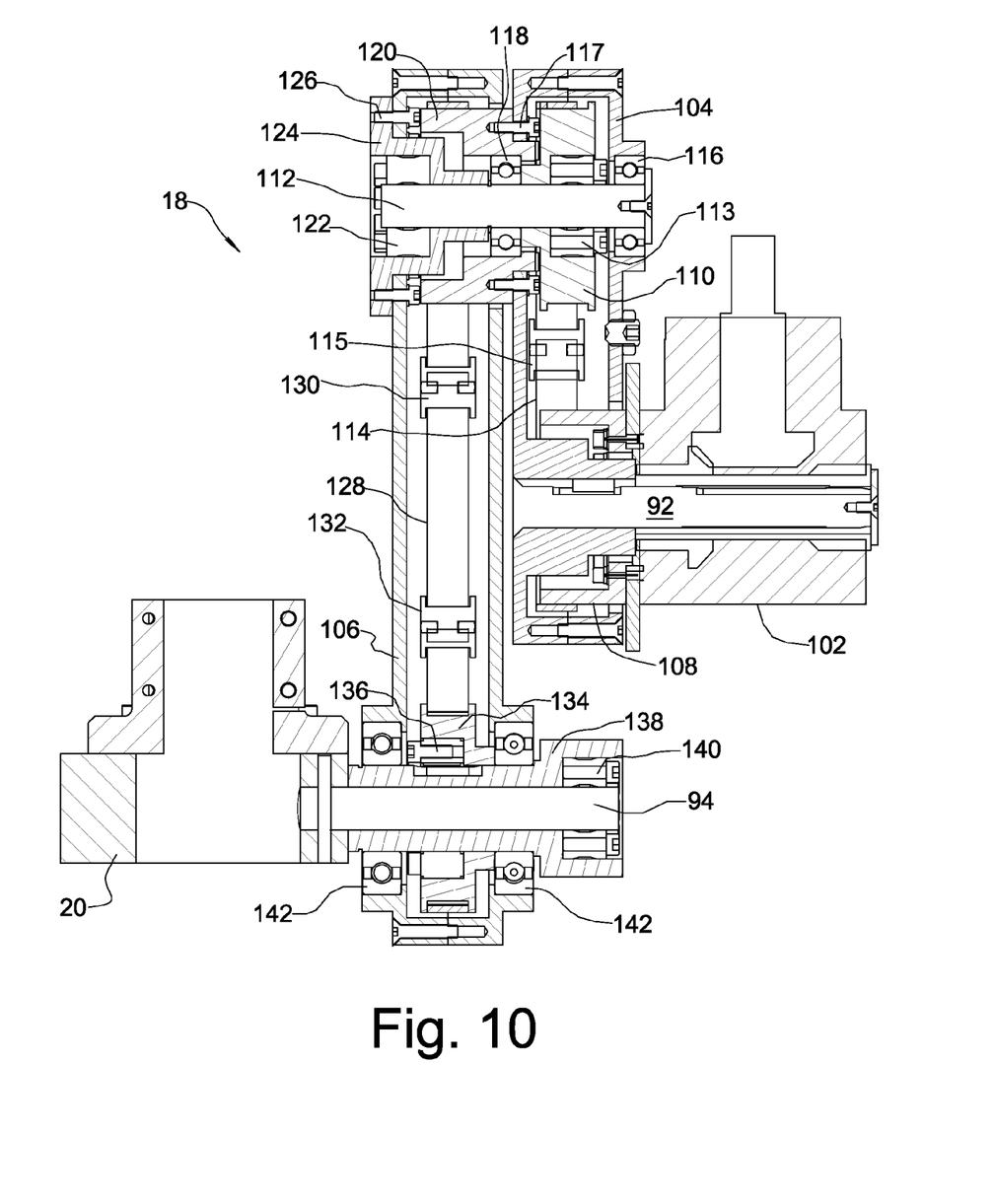
FIG. 10 is a vertical sectional view of a tilt assembly of the bevel head attachment.
Figure 11:
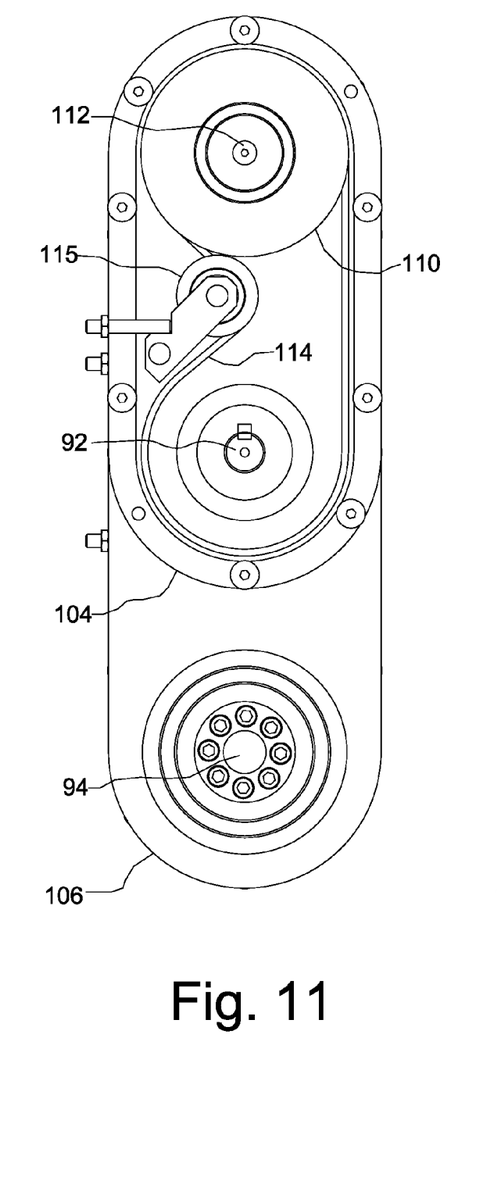
FIG. 11 is a view showing internal components of a first link arm of the tilt assembly.
Figure 12:
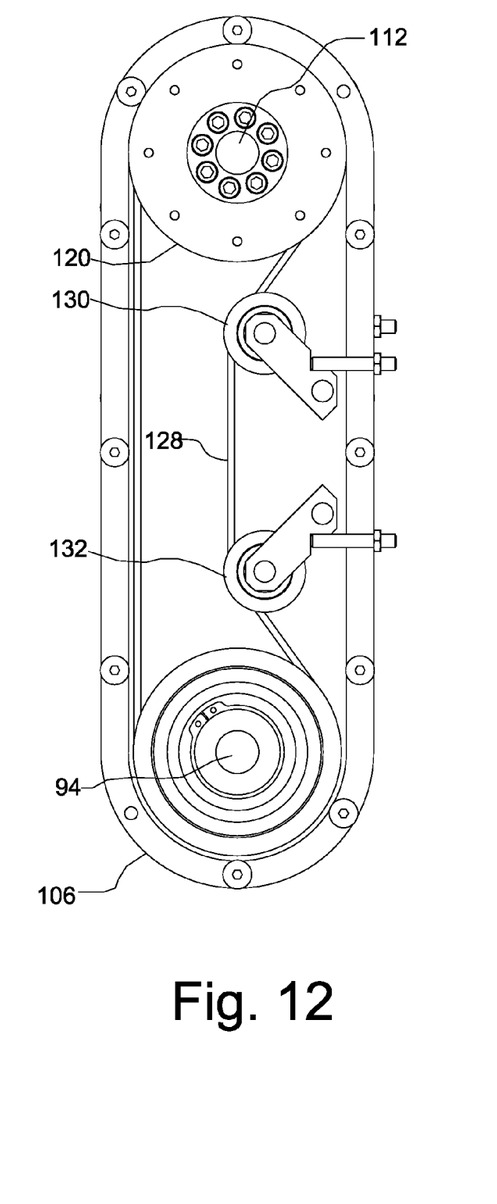
FIG. 12 is a view showing internal components of a second link arm of the tilt assembly.

Tilt assembly 18 for tilting torch holder 20 is now described with additional reference to FIGS. 10-12. Tilt assembly 18 includes a horizontal input shaft 92, an output shaft 94 parallel to input shaft 92, and a linkage 96 transmitting pivotal motion of the input shaft to the output shaft. Input shaft 92 is pivoted by operation of a motor 98 acting through a transmission unit 100 and a bevel gear transmission 102, whereby rotation of motor 98 about a vertical axis is converted to pivotal motion of input shaft 92 about its horizontal axis. The entire tilt assembly 18 is coupled to rotating arm 62 of rotation assembly 16 by mounting transmission unit 100 on a bracket 91 that depends from rotating arm 62, such that tilt assembly 18 will rotate with rotating arm 62 about axis 12.

In the embodiment shown, linkage 96 includes a short link arm 104 and a long link arm 106. Short arm 104 is fixed to input shaft 92 and pivots with input shaft 92 about the axis of the input shaft. A sun pulley 108 is arranged coaxially with input shaft 92 and is fixed to the housing of bevel gear transmission 102. Sun pulley 108 is paired with a planet pulley 110 arranged coaxially about a connection pin 112 at an opposite end of short arm 104 from input shaft 92. A timing belt 114 tensioned by a roller 115 connects sun pulley 108 to planet pulley 110, which in turn is locked to connection pin 112 by a coupling 113 such that when input shaft 92 is pivoted, connection pin 112 undergoes a corresponding pivotal motion about its own axis that is parallel to the axis of input shaft 92. A rotary bearing 116 pivotally mounts connection pin in short arm 104.

Figure 7:
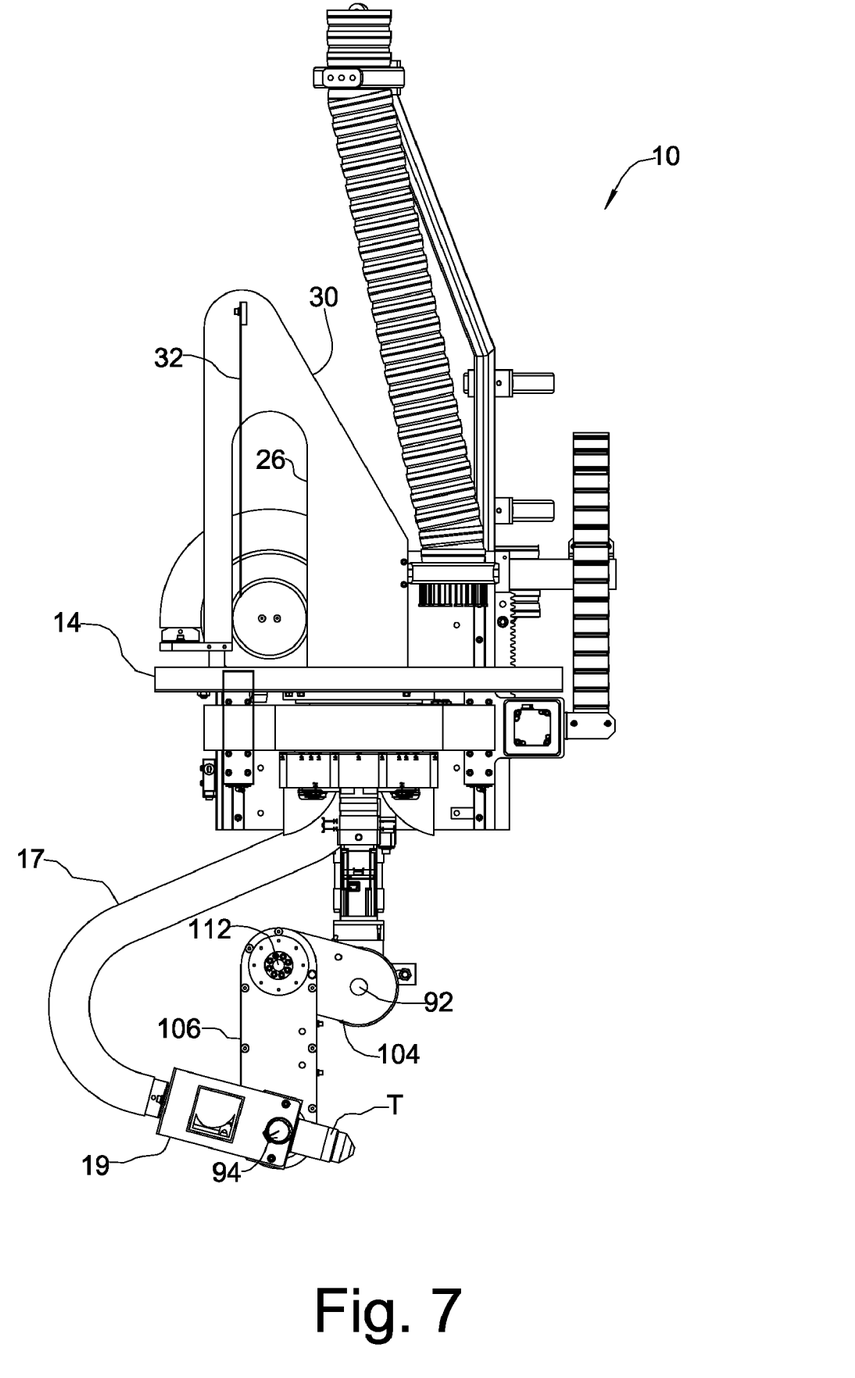
FIG. 7 is a front elevational view of the bevel head attachment shown in a fully-tilted torch position for performing a bevel cut.

Short arm 104 is fixed by fasteners 117 to a sun pulley 120 mounted in long arm 106 by a rotary bearing 118 for pivotal motion about connection pin 112. A coupling 122, a stepped sleeve 124, and fasteners 126 lock connecting pin 112 to large arm 106. Thus, when short arm 104 and connection pin 112 pivot in response to pivotal motion of input shaft 92, long arm 106 will pivot relative to short arm 104 about the axis of connecting pin 112 and will remain in a vertical orientation, as may be seen in FIG. 7. In addition, sun pulley 120 pivots about connecting pin 112 relative to long arm 106. A timing belt 128 tensioned by rollers 130 and 132 connects sun pulley 120 to a planet pulley 134 at the opposite end of long arm 106. Planet pulley 134 is locked to by a coupling 136 to a surrounding sleeve 138, which in turn is locked by another coupling 140 to output shaft 94. Consequently, pivotal motion transmitted from sun pulley 120 via timing belt 128 to planet pulley 134 is further transmitted to output shaft 94. Sleeve 138 is mounted by rotary bearings 142 to pivot relative to long arm 106. Torch holder 20 is fixed to pivot with output shaft 94 and sleeve 138 relative to long arm 106. As may be understood from the foregoing, pivotal motion at input shaft 92 results in corresponding pivotal motion at output shaft 94. FIG. 7 shows that torch T and short arm 104 are tilted in parallel relation to one another while long arm 106 remains vertical.

Attention is directed again to FIG. 6. As understood by those skilled in the art, torch T has a focal point FP, and it is desirable that focal point FP remain in the same location while torch T is rotated by rotation assembly 16 and tilted by tilt assembly 18. For that reason, the distance D1 between the respective axes of input shaft 92 and connecting pin 112 should be made equal to the distance D2 between the axis of output shaft 94 and focal point FP.

An advantage of the present invention is that it provides a greater range of tilt to the torch holder, whereby bevel angles significantly greater than 45 degrees can be achieved. The present invention provides bevel angles in a range of about +/−75 degrees. The ability to achieve greater bevel angles will facilitate fabrication of domes and curved panels, to name one example of a beneficial application.

Components such as tray 14, mounting plate 38, fixed arm 60, rotating arm 62, linkage arms 104 and 106, and others, may be manufactured from a strong, lightweight material, for example aluminum. Bevel head attachment 10 embodies a lighter weight, more compact design, thereby making it suitable for use with a variety of torch cutting machines.

What is claimed is:

1. A bevel head attachment for mounting on a carriage of a cutting machine for controlling the tilt angle of a cutting torch held by the bevel head attachment, the bevel head attachment comprising:
a horizontal support tray having an opening therethrough;
a rotation assembly mounted under the support tray, the rotation assembly including a fixed arm, a rotating arm mounted for rotation relative to the fixed arm about a vertical axis, and
a first motor operable to rotate the rotating arm about the vertical axis, wherein the rotation assembly has a passage therethrough aligned on the vertical axis and overlapped at least partially by the tray opening;
a tilt assembly coupled to the rotating arm of the rotation assembly for rotation with the rotating arm, the tilt assembly including an input shaft, a second motor operable to pivot the input shaft, an output shaft parallel to the input shaft, and a linkage transmitting pivotal motion of the input shaft to the output shaft; and
a torch holder coupled to the output shaft of the tilt assembly for pivotal motion with the output shaft.

2. The bevel head attachment according to claim 1, further comprising a lift assembly including a mounting plate fixedly attachable to the carriage, a toothed rack fixed to the mounting plate to extend in a vertical direction, a third motor mounted on the fixed arm of the rotation assembly, and a pinion gear driven by the third motor and mated with the toothed rack.

3. The bevel head attachment according to claim 2, wherein the mounting plate includes a pair of vertical linear guides spaced laterally from one another, and the fixed arm of the rotation assembly includes a pair of followers slidably mating with the pair of linear guides.

4. The bevel head attachment according to claim 1, further comprising a spring-loaded cable tensioning device supported above the support tray.

5. The bevel head attachment of claim 1, wherein the first motor is coupled to the rotating arm and rotates with the rotating arm about the vertical axis.

6. The bevel head attachment of claim 5, wherein the support tray is coupled to the rotating arm and rotates with the rotating arm about the vertical axis.

7. The bevel head attachment of claim 1, wherein the linkage of the tilt assembly includes a first link arm coupled to the input shaft to pivot with the input shaft, and a second link arm connected to the first link arm by a connecting pin extending parallel to the input shaft and the output shaft, wherein the first link arm and the second link arm pivot relative to one another about the connecting pin and the output shaft is carried by the second link arm.

8. The bevel head attachment according to claim 7, wherein the first link arm and the second link arm include a pulley system for transmitting pivotal motion at the input shaft to the to the output shaft such that the output shaft pivots in correspondence with the input shaft.

9. The bevel head attachment according to claim 7, wherein the first link arm is fixed to the input shaft to pivot with the input shaft, and the second link arm remains vertical as the first link arm is pivoted.

10. The bevel head attachment according to claim 1, wherein the torch holder is pivotable through a range of about +/−75 degrees from vertical when a cutting torch is held thereby.

* * * * *